United States Patent [19]
Codrino

[11] 3,958,114
[45] May 18, 1976

[54] LIGHT DIFFUSING DEVICE WITH LIGHT-GUIDE CABLES AND CABLE TERMINAL

[76] Inventor: Giuseppe Codrino, 2, Via Stazione, Quattordio, Alessandria, Italy

[22] Filed: Oct. 15, 1974

[21] Appl. No.: 515,008

[30] Foreign Application Priority Data
Oct. 15, 1973 Italy.................................. 30131/73

[52] U.S. Cl............................. 240/1 LP; 240/8.16; 350/96 R
[51] Int. Cl.²........................................... F21K 7/00
[58] Field of Search.................. 240/1 LP, 8.16, 2.1; 350/96 R

[56] References Cited
UNITED STATES PATENTS

| | | | |
|---|---|---|---|
| 3,423,581 | 1/1969 | Baer | 240/1 LP |
| 3,721,815 | 3/1973 | Wall | 240/1 LP |
| 3,751,655 | 8/1973 | Codrino | 350/96 R |

Primary Examiner—R. L. Moses
Attorney, Agent, or Firm—Michael J. Striker

[57] ABSTRACT

A light-transmission device includes an elongated cylindrical member bounding an internal passage and having an open end and an opposite end which defines a first socket, and a light source received in the internal passage and which extends from the open end towards the opposite end of the elongated cylindrical member. The device further includes a cable terminal which tightly surrounds a plurality of light-conductive cables. The ends of the cables are trimmed and maintained in a plane at a light-impinging end of the terminal. The cable terminal and the elongated cylindrical member are connected together by a connecting member which has an end defining a second socket which receives the light-impinging end of the cable terminal and an opposite end having a plurality of engaging portions which extend into and engage the first socket.

9 Claims, 16 Drawing Figures

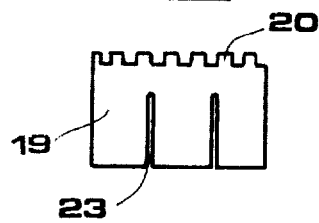
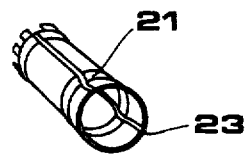
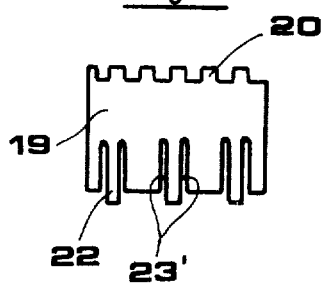
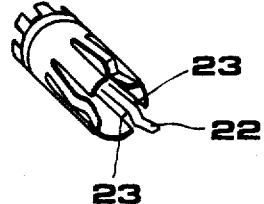
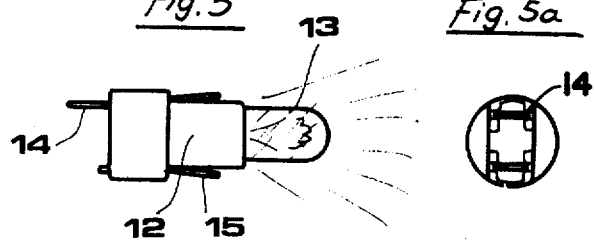
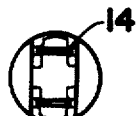
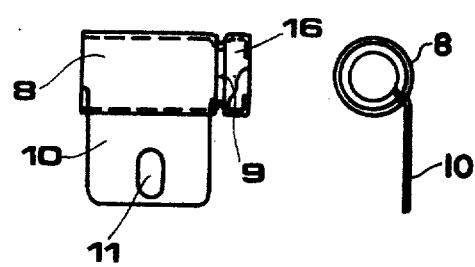
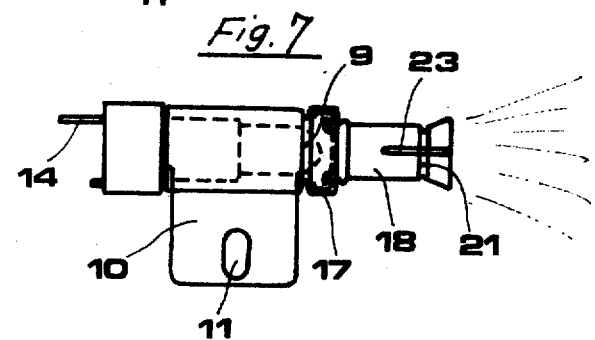

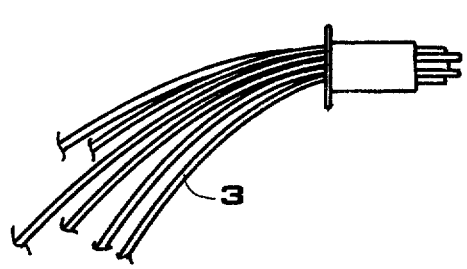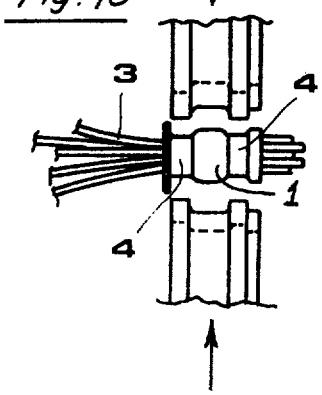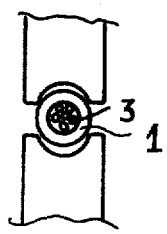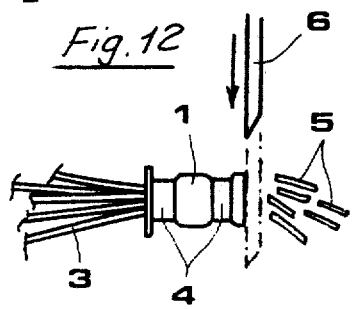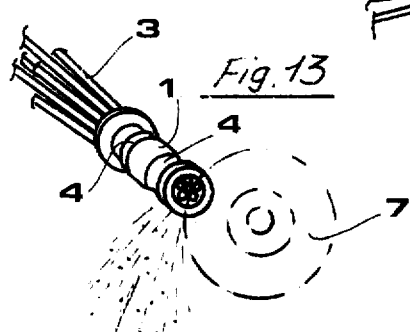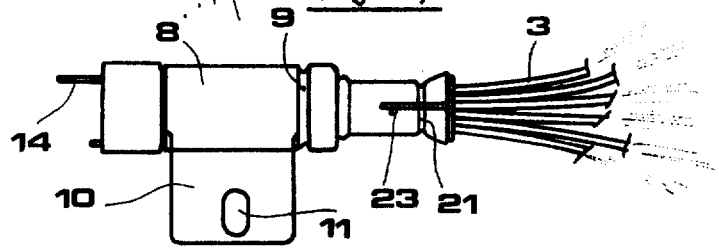

3,958,114

LIGHT DIFFUSING DEVICE WITH LIGHT-GUIDE CABLES AND CABLE TERMINAL

BACKGROUND OF THE INVENTION

This invention relates to a light transmission device including a cable terminal assembly for connecting a plurality of light-conductive cables with a light source.

As is well known, light-conductive cables or light-guides generally comprise bundles of thin filaments of transparent materials. Such cables conduct the optical radiations being emitted from a light source towards a place of application. Such cables may even assume curvilinear paths.

Such cables are particularly applicable for indirectly lighting measuring equipment and control panels, and they also find widespread application in the automotive and aeronautics industry.

In order to maximize the transmission characteristic of such cables, it is advisable for a plurality of such cables to be simultaneously supplied by a single light source.

Thus, one may start from a single light source and create a multiplicity of light sources, each of which are capable of lighting various parts of an instrument panel.

SUMMARY OF THE INVENTION

The light transmission device and its associated cable terminal assembly achieves the above-outlined object in a simple, practical and satisfactory manner.

The cable terminal assembly is comprised of several members, one of which is a small tubular cable-holding member. This member surrounds a bundle of light-conductive cables and is adapted to securely lock and hold them within its interior.

The cable-holding member is additionally shaped so as to be interconnected with a light-source holding member. The light source may be provided with attenuation means.

The cable assembly further comprises an elongated cylindrical mounting member which is adapted to receive a light source.

The cylindrical mounting member is elongated in the direction of the light flow and is connected to a tubular connecting member. The connecting member is provided with a wall which is adapted to be resiliently elastic.

The tubular connecting member also facilitates the guiding of the light rays so that all light-conductive cables are uniformly struck by the light flow emitted by the light source.

Another feature of the connecting member is embodied in providing a circumferentially-extending constriction which is adapted to overlie and snap into a similar constriction provided in the cable-holding member, thereby securely anchoring the interconnected members to each other in a stable manner.

This latter feature may be embodied in a particularly simple manner by radially constricting the walls of the respective members.

These and further characteristic features of a functional and constructional nature according to the present invention will be better understood from the following detailed description, taken in conjunction with the accompanying drawing.

BRIEF DESCRIPTION OF THE DRAWING

FIG. 1 is a top view of a metal blank prior to its being formed into the tubular connecting member of the assembly;

FIG. 2 is a perspective view of the tubular connecting member, after the blank of FIG. 1 has been shaped;

FIGS. 3 and 4 respectively correspond to FIGS. 1 and 2 and show another embodiment of the tubular connecting member;

FIG. 5 is a side view of the light-source holding member;

FIG. 5a is a rear view of FIG. 5;

FIG. 6 is a top view of the mounting member of the cable assembly;

FIG. 6a is a rear view of FIG. 6;

FIG. 7 is a side view of a portion of the cable assembly;

FIG. 8 is a side view of the cable-holding member of the assembly;

FIG. 9 is a side view of the cable-holding member surrounding a plurality of light-conducting cables;

FIGS. 10 and 11 are diagrammatic side and front views of the apparatus used in shaping the cable-holding member for locking the light-conducting cables therein;

FIG. 12 is a diagrammatic side view of a cutting device for trimming the ends of the cables;

FIGS. 13 is a diagrammatic perspective view of a grinding device used in conjunction with the invention; and FIG. 14 is a side view of all of the elements interconnected according to the invention.

DETAILED DESCRIPTION OF THE PREFERRED EMBODIMENT

Referring now particularly to the reference numerals contained in the various Figures of the accompanying drawing, the cable terminal assembly for cables which are adapted to guide and conduct light comprises a small metallic tube 1 for surrounding a bunch of said cables 3, as shown in FIG. 9. The cable-holding member or cable terminal 1 is provided at one of its ends with a flange portion 2, as shown in FIG. 8, which is adapted to serve as a limiting stop.

Within the terminal 1, which has an internal passage of predetermined diameter, there is inserted the end portions of a plurality of light-conducting cables 3.

The terminal 1 and the cables 3 contained therein are subsequently subjected to a rolling and hammering operation, as diagrammatically illustrated in FIGS. 10 and 11. At least one circumferential groove or construction 4 is formed about the exterior of the terminal 1 for locking the cables 3 in place within the terminal 1.

Thereafter, the projecting ends 5 of the cables 3 which extend beyond the other end of the tube 1 which is opposite to the end having the flange portion 2 are cut off in line with the end face of the other end of the terminal 1, preferably by using a cutting device 6. The cutting device may be a guillotine-type cutter, as diagrammatically illustrated in FIG. 12.

The cut ends of the cables 3 are thereupon polished by means of a rotary grinding disc 7 which is covered with conventional abrasive material, as shown in FIG. 13.

The cable terminal assembly further comprises a cylindrical metal envelope or elongated member 8 having a circumferential constriction 9 at one of its ends, as shown in FIG. 6.

The elongated member 8 is provided with a mounting plate 10 which extends in a general tangential direction away from the envelope 8, as shown in FIG. 6a. A mounting hole 11 is drilled through the thickness of the plate 10 which is adapted to receive an anchoring member, such as a screw.

The cable terminal assembly further comprises a light-source holding member, as shown in FIGS. 5 and 5a, which is adapted to be inserted within the elongated cylindrical member 8 and maintained therein under tension. A small socket 12 supports the lamp 13, which is energized by means of the lead terminal 14. The lead terminal 14 projects from the rear portion of the socket 12. Earthing strips or ground terminals 15 are arranged laterally on opposite sides of the socket 12.

A flange is provided at the end 16 of the mounting member 8; and a holding circlip or C-shaped clip 17 fastens the elongated member 8 to a tubular connecting member 18, as shown in FIG. 7.

The connecting member 18 is formed from a blank or rectangular plate 19 which is provided on one side with a series of engaging portions or projections 20, as shown in FIG. 1.

The plate 19 may have one or more slits, either single or dual cuts 23 and 23', respectively shown in FIGS. 1 and 3. The slits extend longitudinally up to the end opposite to the end provided with the projections 20 and impart a suitable elasticity to the wall of the tubular connecting member 18, which is obtained by bending the plate 19 itself.

After the tubular connecting member 18 has been inserted into the flange end 16 of the elongated member 8, the projections 20 are curved outwardly so as to form a plurality of engaging portions which extend into the circlip 17 and engage the flange end 16, as shown in FIG. 7.

The tubular connecting member 18, made from the plate 19 shown in FIG. 1, has a circumferential and continuous groove 21.

Alternatively, if the tubular member 18 is made from the plate 19 illustrated in FIG. 3, then the strips 22, which are delimited by the dual cuts 23', are to be inwardly folded over.

In both cases, however, the free end of the tubular connecting member 18 has an outwardly flaring configuration so as to facilitate the insertion of the cable-holding member 1 into the tubular connecting member 18.

The inside diameter of the tubular connecting member 18 should be equal to the outside diameter of the cable-holding member 1, and the arrangement of their respective constrictions formed in their walls are arranged to overlie each other and thereby hold each other clamped in position.

From the foregoing description and from a perusal of the various figures of the accompanying drawing, one may easily see the great functional character and practical application characterizing the cable terminal assembly which connects a light source with light-conducting cables according to this invention.

The light source and its related manufacturing process have been previously described and disclosed by way of non-limiting embodiment example for the purpose of demonstrating the practical feasibility of the constructive features of this invention.

Obviously, various changes and modifications with regard to shape, construction and dimensions may be introduced into the various parts constituting the light source and the various members of this invention depending upon the specific application requirements.

It is, therefore, to be understood that any such changes and modifications shall be deemed as falling within the scope of this invention.

I claim:

1. A light-transmission device, comprising an elongated cylindrical member bounding an internal passage and having an open end and an opposite end defining a first socket; light source means received in said passage and extending from said open end of said elongated cylindrical member towards said opposite end thereof; a cable terminal tightly surrounding a plurality of light-conductive cables, said cables having exposed ends which are held in fixed position at a light-impinging end of said terminal; and a connecting member for interconnecting said terminal and said elongated cylindrical member, said connecting member having an end defining a second socket which receives said light-impinging end of said terminal, and an opposite end having a plurality of engaging portions extending into and engaging said first socket.

2. A device as defined in claim 1, wherein said elongated cylindrical member has an axis and a mounting plate, and wherein said opposite end defining a first socket has a flange portion extending radially inwardly at least in part towards said axis.

3. A device as defined in claim 2, wherein said connecting member is generally cylindrical, and wherein said engaging portions comprise a plurality of projections distributed about the periphery of said opposite end of said connecting member and extending radially outwardly at least in part of said axis, said projections engaging said flange portion of said elongated cylindrical member.

4. A device as defined in claim 3; and further comprising a circlip surrounding said projections.

5. A device as defined in claim 1, wherein said end of said connecting member defining a second socket has a first constricted portion and an adjacent outwardly-flaring portion, and wherein said cable terminal has a second constricted portion at its light-impinging end, said first constricted portion overlying said second constricted portion for securing said cable terminal to said connecting member when the former is inserted into the outwardly-flaring portion of the latter.

6. A device as defined in claim 1, wherein said connecting member is cylindrical and of resiliently elastic material, and wherein said connecting member has longitudinal slits extending at least in part in the direction of its elongation.

7. A device as defined in claim 1, wherein said exposed ends of said cables are positioned and maintained in a fixed plane at said light-impinging end.

8. A device as defined in claim 1, wherein said light source means comprises a light bulb and an electrical socket supporting said light bulb.

9. A device as defined in claim 1, wherein said elongated cylindrical member, said cable terminal and said connecting member are of metallic material.

\* \* \* \* \*